Figure 1:
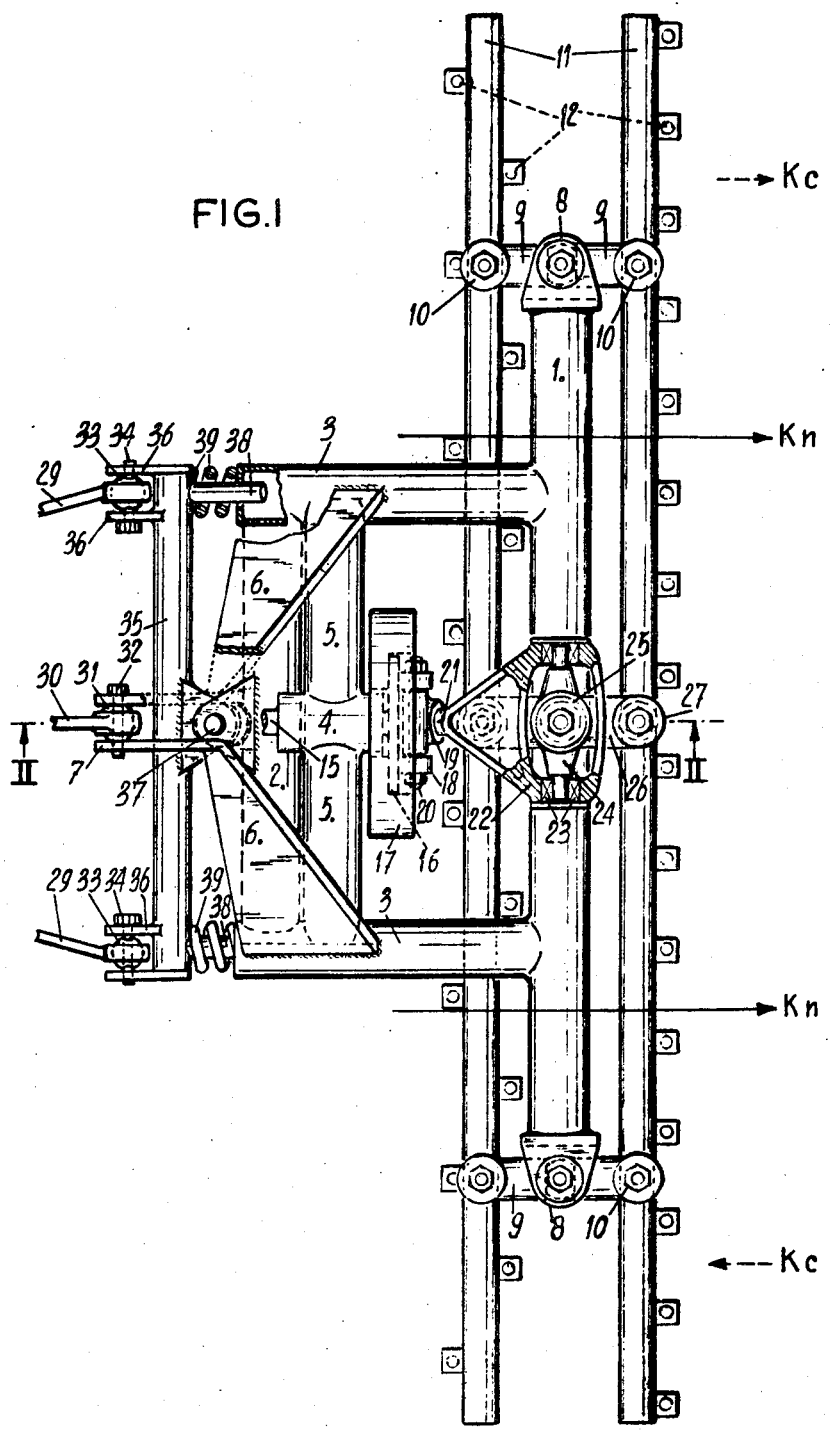

United States Patent
Vissers

[15] 3,706,346
[45] Dec. 19, 1972

[54] MOVEMENT ABSORBING LOWER LINKS HITCH FRAME PIVOTALLY CONNECTED ABOUT AN UPWARDLY FORWARDLY INCLINED AXIS TO A RECIPROCATING HARROW

[72] Inventor: Herbert Vissers, Nieuw-Vennep, Netherlands

[73] Assignee: H. Vissers N.V., Nieuw-Vennep, Netherlands

[22] Filed: Sept. 8, 1970

[21] Appl. No.: 70,054

[30] Foreign Application Priority Data

Sept. 17, 1969 Netherlands ...................... 69/14073

[52] U.S. Cl. .................... 172/102, 172/449, 172/678
[51] Int. Cl. ...A01b 35/10, A01b 59/06, A01b 61/02
[58] Field of Search....172/40, 47, 53, 54, 84, 97–99, 172/101–102, 439, 447, 449, 450, 451, 678

[56] References Cited

UNITED STATES PATENTS

| 2,872,990 | 2/1959 | Fraga | 172/449 |
| 2,888,997 | 6/1959 | Fraga | 172/449 |
| 3,520,372 | 7/1970 | Beck | 172/53 |
| 3,219,127 | 11/1965 | Van Der Lely et al. | 172/449 |

FOREIGN PATENTS OR APPLICATIONS

| 1,501,335 | 11/1967 | France | 172/439 |
| 6,703,867 | 9/1968 | Netherlands | 172/102 |
| 84,701 | 4/1958 | Denmark | 172/447 |
| 1,132,375 | 5/1962 | Germany | 172/450 |

Primary Examiner—Robert E. Pulfrey
Assistant Examiner—C. W. Hanor
Attorney—Snyder and Butrum

[57] ABSTRACT

An agricultural implement is provided comprising a frame, to be connected to a tractor and a reciprocating tool cultivating the soil.

For preventing the reciprocating tool to force the tractor to make an oscillatory movement the tractor is connected to the frame of the implement through an auxiliary frame which is connected swingably to the frame for a swinging movement around an axis inclining forwardly.

8 Claims, 3 Drawing Figures

INVENTOR

HERBERT VISSERS

MOVEMENT ABSORBING LOWER LINKS HITCH FRAME PIVOTALLY CONNECTED ABOUT AN UPWARDLY FORWARDLY INCLINED AXIS TO A RECIPROCATING HARROW

The invention relates to an agricultural implement for cultivating soil, more particularly a harrow, said implement being adapted to be moved in a forward direction and comprising a frame, a tool which is supported by said frame, driving means for reciprocating said tool transversely of said forward direction, and comprising an auxiliary frame to be suspended from a tractor, which auxiliary frame can swing in relation to the frame around a standing axis extending in a central longitudinal plane of the implement.

An agricultural implement of the kind specified is known. The reciprocating tool tends to force the agricultural implement to make an oscillatory movement. In the prior art agricultural implement the oxcillatory movement is absorbed by springs disposed between the auxiliary frame and the frame. Despite the springs both the agricultural implement and the tractor are liable to violent jolting which is uncomfortable to the tractor driver and also causes heavy wear to the tractor and the agricultural implement.

These disadvantages are obviated according to the invention by forwardly inclining said standing axis. If the agricultural implement is deflected to one side, the tool penetrates more deeply into the soil on that side, so that the soil on that side of the agricultural implement exerts a rearwardly-directed corrective extra force thereon to force the implement back into the center. Such corrective force reduces the restoring force which the tractor must exert on the agricultural implement via springs disposed between the frame and the auxiliary frame to hold the agricultural implement steady.

A further development of the agricultural implement according to the invention completely obviates the restoring force which the tractor must exert on the agricultural implement. This agricultural implement is characterized by a free swinging movement around the standing axis between the frame and the auxiliary frame.

The springs between the auxiliary frame and the frame are therefore eliminated, thus making the implement even cheaper. Another important feature is that the frame of the implement is substantially quieter and the tractor does not experience jolting movements.

Figure 2:
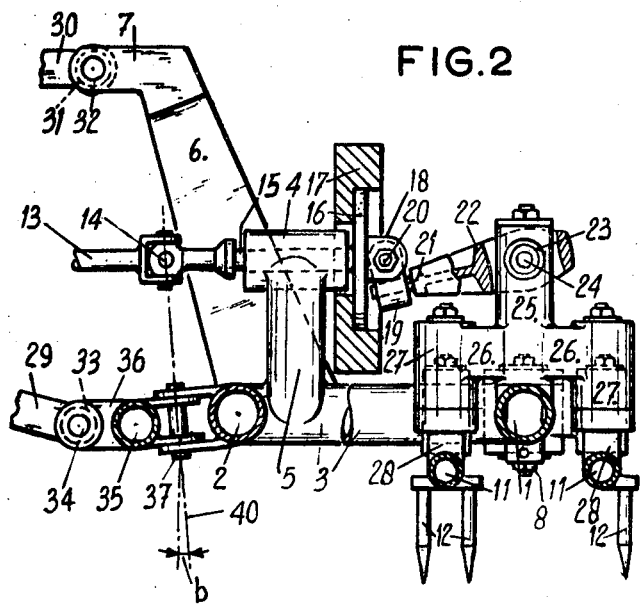
Figure 3:
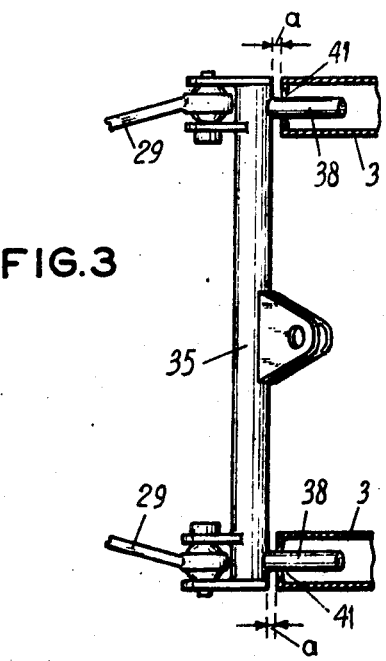

The invention will now be described in detail with reference to the drawings, wherein:

FIGS. 1 and 2 are partly cutaway plan and side views respectively of a harrow according to the invention, and FIG. 3 is a preferred variant of a detail of FIG. 1.

A harrow frame comprises a transverse beam 1, a transverse beam 2, two longitudinal beams 3, a horizontal longitudinally extending bearing bush 4, two inclined supports 5 connecting the bearing bush 4 to the longitudinal beams 3, and two supporting plates 6 extending at an inclination upwardly from the longitudinal beams 3 and each having a lug 7.

Lugs 8 for the pivotable mounting of levers 9 are disposed at the ends of the transverse beam 1. Ends 10 of the levers 9 are hingeably connected to harrow bars having tines 12. The harrow bars 11 are therefore attached to the frame 1 with provision for lateral reciprocation and form the tool of the agricultural implement.

The reciprocating harrow bars 11 are driven from power take off 13 of the tractor which power take off is connected via a universal joint 14 to drive-shaft 15.

The driveshaft 15 is mounted for rotation in the bush 4 and terminates in a flange 16 to which a flywheel 17 is attached. The flange 16 has two lugs 18 to which a bush 19 is attached to hinge around a holt 20 extending through such lugs. The free stem end 21 of a fork 22 is pivotably mounted in the bush 19. The fork 22 engages via ball bearings 23 two coaxial transverse arms 24 of a crank 25. When the shaft 15 rotates, the crank 25 makes an oscillatory movement. The crank 25 has at its bottom end two arms 26 which are offset by an angle of 90° in relation to the transverse arms 24. The ends of the crank arms 26 have bearing bushes 27 for vertical pins 28 disposed on the top of the harrow bars 11.

The harrow is attached to a tractor (not shown) by means of two levers 29 which are connected to the tractor by their front ends at the same height via universal joints and can be adjusted to the required angle and retained therein by a lifting device, to enable the height of the implement to be adjusted in relation to the tractor. A third suspension member used is a top bar 30 also connected by its front end to the tractor via a universal joint. The rear end of the bar 30 is connected via a ball and socket joint 31 to a pin 32 extending through the lugs 7. The rear ends of the levers 29 are each hingeably attached via a ball and socket joint 33 to a pin 34 extending through lugs 36 of a transverse bar 35 which forms the auxiliary frame and is connected via a pivot pin 37 to the transverse member 2 of the frame. The pivot pin 37 is coaxial with a forwardly-inclined standing axis 40 extending in the central longitudinal plane. The angle $b$ enclosed with the vertical is, for instance, 5°.

With the described construction of the connection between the tractor and the harrow, the harrow frame can make oscillatory swinging movements in relation to the auxiliary frame 35 and the tractor around the standing axis 40.

When during an oscillatory movement the harrow is deflected, for instance, to the right, due to the forwardly inclined axis 40 the tool consisting of the harrow bars 11 penetrates somewhat more deeply into the soil on the right-hand side, whereas on the left-hand side the device is raised somewhat, so that the normal soil cultivating force $K_n$ is corrected by opposite corrective forces $K_c$ together forming a restoring torque forcing the harrow back into its starting position. Such restoring torque reduces the restoring torque exerted by springs 39 and therefore reduces tractor jolting.

Preferably, as shown in FIG. 3, the springs 39 are omitted. At each pin 38, a clearance $a$ is left between the frame and the auxiliary frame 35. During tests with a particular harrow, a clearance $a$ of the order of 5 cm was found to be completely adequate to prevent the frame and the auxiliary frame 35 from repeatedly knocking together and causing a jolting effect.

What I claim is:

1. An agricultural implement adapted to be secured to a tractor having a power take-off, transversely spaced lower lift links and a central upper link, said implement comprising:

an auxiliary frame including means pivotally connecting the auxiliary frame to said lower lift links about a horizontal transverse axis;

an implement frame including means pivotally connecting the implement frame to said upper link;

coupling means pivotally connecting said implement frame to said auxiliary frame about a pivot axis lying in a vertical longitudinal plane and inclined upwardly forwardly therewithin;

guide means connecting said implement frame to said auxiliary frame at laterally spaced points on opposite sides of said coupling means for allowing limited relative motion between said frames about said pivot axis;

a cultivating implement including means mounting the cultivating implement on said implement frame for transverse reciprocation with respect thereto; and drive means connecting said power take-off to said implement for effecting said reciprocation of the implement.

2. An agricultural implement as defined in claim 1 including spring means interposed between said auxiliary and implement frames for resisting pivotal motion therebetween about said pivot axis.

3. An agricultural implement as defined in claim 1 wherein said drive means includes a longitudinally extending shaft carried by said implement frame and a universal joint on said shaft located along an extension of said pivot axis.

4. An agricultural implement as defined in claim 3 wherein the pivotal connections between said lower links and said auxiliary frame and the pivotal connection between said implement frame and the upper link lie forwardly of said pivot axis.

5. An agricultural implement as defined in claim 1 wherein said guide means comprises a pair of rearwardly projecting pins fixed to said auxiliary frame and forwardly projecting tubular frame portions on said implement frame receiving said pins.

6. An agricultural implement as defined in claim 5 including spring means interposed between said auxiliary and implement frames for resisting pivotal motion therebetween about said pivot axis.

7. An agricultural implement as defined in claim 5 wherein said drive means includes a longitudinally extending shaft carried by said implement frame and a universal joint on said shaft located along an extension of said pivot axis.

8. An agricultural implement as defined in claim 7 wherein the pivotal connections between said lower links and said auxiliary frame and the pivotal connection between said implement frame and the upper link lie forwardly of said pivot axis.

* * * * *